US009420875B2

(12) United States Patent
Diskin (10) Patent No.: US 9,420,875 B2
(45) Date of Patent: Aug. 23, 2016

(54) IN-BAY CAR WASH TIRE DRESSING APPLICATOR AND SYSTEM (71) Applicant: Troy Diskin, Algonquin, IL (US)

(72) Inventor: Troy Diskin, Algonquin, IL (US)

(73) Assignee: DISKIN SYSTEMS, INC., Algonquin, IL (US)

(*) Notice: Subject to any disclaimer, the term of this patent is extended or adjusted under 35 U.S.C. 154(b) by 31 days.

(21) Appl. No.: 14/673,234

(22) Filed: Mar. 30, 2015

(65) Prior Publication Data

US 2015/0273515 A1  Oct. 1, 2015

Related U.S. Application Data (60) Provisional application No. 61/967,973, filed on Mar. 31, 2014.

(51) Int. Cl.
B05B 7/04 (2006.01)
A46B 11/06 (2006.01)
B05B 7/06 (2006.01)
B05B 7/12 (2006.01)
A46B 5/00 (2006.01)
A46B 15/00 (2006.01)
B05B 7/16 (2006.01)
B60S 3/04 (2006.01)

(52) U.S. Cl.
CPC ............ *A46B 11/066* (2013.01); *A46B 5/0095* (2013.01); *A46B 15/0051* (2013.01); *B05B 7/066* (2013.01); *B05B 7/12* (2013.01); *A46B 2200/3046* (2013.01); *B05B 7/04* (2013.01); *B05B 7/1606* (2013.01); *B05B 7/1693* (2013.01); *B60S 3/042* (2013.01)

(58) Field of Classification Search
CPC ..... A46B 2200/3046; B05B 7/04; B05B 7/1606; B05B 7/1693
USPC ........................ 401/289; 239/424, 424.5, 425
See application file for complete search history.

(56) References Cited

U.S. PATENT DOCUMENTS

| 1,872,058 A | * | 8/1932 | Bramsen | .................... B05B 7/04 239/416.4 |
| 6,048,583 A | * | 4/2000 | Waddell | ................ B05B 1/3436 118/304 |
| 8,939,668 B2 | * | 1/2015 | Waddell | .................. B05B 15/04 401/139 |

* cited by examiner

Primary Examiner — Mark A Laurenzi
Assistant Examiner — Joshua Wiljanen
(74) Attorney, Agent, or Firm — Justin Lampel (57) ABSTRACT An in-bay car wash tire dressing applicator and system is provided. The applicator has a housing having a nozzle portion having an internal atomizer for tire shine fluid. The atomizer receives the tire shine fluid and pressurized air flow from a pump and mixes the two at the distal tip of the applicator for optimal spraying of the tire shine fluid. A brush located at a distal end of the nozzle allows a user to evenly and smoothly apply the tire shine fluid to the tire of an automobile. The brush may be located at a forty-five degree angle with respect to the main shaft of the tire dressing applicator so as to better apply the tire shine to the tire.

7 Claims, 6 Drawing Sheets

IN-BAY CAR WASH TIRE DRESSING APPLICATOR AND SYSTEM

CROSS REFERENCE TO RELATED APPLICATIONS

The following application is based on and claims the priority benefit of U.S. provisional application Ser. No. 61/967,973 filed Mar. 31, 2014; the entire contents of which are incorporated by reference.

BACKGROUND OF THE INVENTION

An in-bay car wash tire dressing applicator and system is provided. The applicator has a housing having a nozzle portion having an internal atomizer for tire shine fluid. The atomizer receives the tire shine fluid and pressurized air flow from a pump and mixes the two at the distal tip of the applicator for optimal spraying of the tire shine fluid. A brush located at a distal end of the nozzle allows a user to evenly and smoothly apply the tire shine fluid to the tire of an automobile. The brush may be located at a forty-five degree angle with respect to the main shaft of the tire dressing applicator so as to better apply the tire shine to the tire and a more ergonomic application.

Applicators for tires have been invented in the past. For example, U.S. Pat. No. 6,936,104 to Gorra discloses a vehicle tire dressing apparatus having left and right dressing applicators situated alongside a vehicle conveying track, the dressing applicators being moveable individually into contacting engagement with tires on left and right sides of a vehicle in the track. Each applicator has an applicator pad mounted to a mount bar and the mount bar is hinged to a frame which allows articulation of the applicator pad into and out of contact with the tires. The applicator pad is configured with a plurality of orifices, each of which orifices receives fluid sprayed from a complimentary spray nozzle. Each orifice has an elongated capillary which assists dispersing fluid into the pad. The spray nozzles emit fluid into the pads for a predetermined amount of time, the spraying being initiated by movement of the vehicle into proximity with the tire dressing assembly.

Further, U.S. Pat. No. 7,582,164 to Krause discloses a tire dressing system for applying tire dressing to vehicle tires. The tire dressing system generally includes a support unit, a spray unit movably positioned within the support unit, an actuator unit connected to the spray unit, a tire sensor to determine the size of a vehicle tire, and a tire position sensor to determine the location of the vehicle tire. The spray unit includes a hollow cone nozzle telescopically supported within the spray unit to adjust the spray pattern applied to the sidewall of the vehicle tire depending upon the size of the vehicle tire. After the size of the vehicle tire is determined, the proximity of the hollow cone nozzle is adjusted to apply the desired spray pattern to the sidewall. The hollow cone nozzle then applies the dressing to the sidewall of the vehicle tire as the vehicle moves by the spray unit.

Still further, U.S. Pat. No. 6,383,295 to Frederick Jr. discloses a tire dressing apparatus controlled by a carwash controller operated typically by an attendant at the carwash. The width of a vehicle entering the carwash is determined mechanically by an index arm, the identification of the vehicle selected for application of the tire dressing fluid to the vehicle's tires, and a programmable logic controller controls a spraying sequence by controlling the time intervals between the activation of solenoids controlling fluid release through nozzles during each vehicle tire dressing cycle. The programmable logic controller includes sufficient memory to keep track of the vehicle in the carwash que or in the carwash in the event of some mechanical or electrical interruptions to the carwash operation. A unique nozzle design has been provided to obtain the desired fluid distribution and coverage on the vehicle tires.

However, these patents fail to describe a tire dressing applicator which is easy to use and efficient as in the present application. Further, these patents fail to provide a tire dressing applicator which atomizers a tire shine fluid and evenly applies the fluid to the tire of an automobile.

SUMMARY OF THE INVENTION

An in-bay car wash tire dressing applicator and system is provided. The applicator has a housing having a nozzle portion having an internal atomizer for tire shine fluid. The atomizer receives the tire shine fluid and pressurized air flow from a pump and mixes the two at the distal tip of the applicator for optimal spraying of the tire shine fluid. A brush located at a distal end of the nozzle allows a user to evenly and smoothly apply the tire shine fluid to the tire of an automobile. The brush may be located at a forty-five degree angle with respect to the main shaft of the tire dressing applicator so as to better apply the tire shine to the tire.

An advantage of the present device tire dressing applicator is that the present tire dressing applicator evenly applies a tire shine fluid onto the tires of an automobile.

Still another advantage of the present tire dressing applicator is that the present tire shine applicator atomizers a tire shine fluid prior to applying the tire shine fluid to the tires of an automobile. This atomization does not cause a mess on the floor which would otherwise cause a liability and safety issues for the car wash owner.

And another advantage of the present tire dressing applicator is that the present tire dressing applicator has a brush which allows a user to control the amount and of the tire shine fluid. This allows the car wash owner to increase or decrease the speed of the spray. This is important because the tire shine fluid is very expensive. Because the carwash owner makes money when the fluid is sprayed having this increase or decrease allows them to control the time spent shining tires. This directly affects their profitability at the self service car wash bay.

An advantage of the present tire dressing applicator is that the present tire dressing applicator has a nozzle guard which may prevent dirt or debris from gaining access into the interior of the nozzle tip and may further prevent the nozzle tip from freezing. The atomizing tip needs to be slightly recessed into the wand so it doesn't get a direct blast of water causing it freeze the tip.

Yet another advantage of the present tire dressing applicator is that the present tire dressing applicator may be attached to a swivel tube which allows the tire dressing applicator to be easily maneuvered in a self-service car wash. This allows the tire shiner to shine without having to increase or decrease the angle at which they hold the wand handle. As the brush is moved around the tire, the brush stays fully connected to the tire because the brush is on a swivel.

And an advantage of the present tire dressing applicator is that the present tire dressing applicator may have a padded region which allows the user to spread on the tire shine fluid the desired manner.

Still another advantage of the present tire dressing applicator is that the tire dressing applicator may have a brush portion which is at approximately a forty-five degree angle with respect to the a main delivery tube of the tire dressing applicator.

For a more complete understanding of the above listed features and advantages of the present in-bay tire dressing applicator reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

An in-bay car wash tire dressing applicator and system is provided. The applicator has a housing having a nozzle portion having an internal atomizer for tire shine fluid. The atomizer receives the tire shine fluid and pressurized air flow from a pump and mixes the two at the distal tip of the applicator for optimal spraying of the tire shine fluid. A brush located at a distal end of the nozzle allows a user to evenly and smoothly apply the tire shine fluid to the tire of an automobile. The brush may be located at a forty-five degree angle with respect to the main shaft of the tire dressing applicator so as to better apply the tire shine to the tire.

Figure 1:
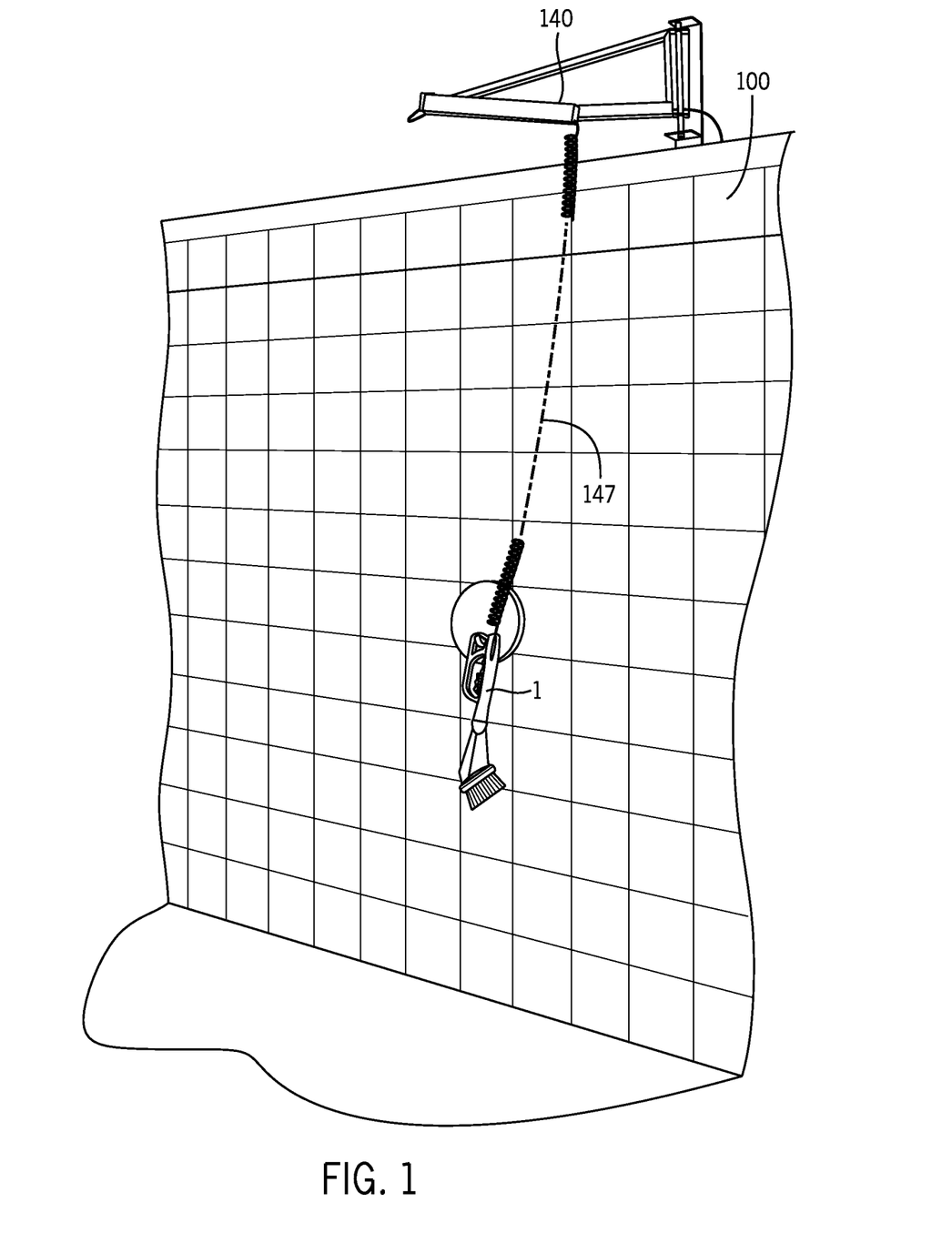
FIG. 1 illustrates the tire dressing applicator located within an in-bay car wash.
Figure 2:
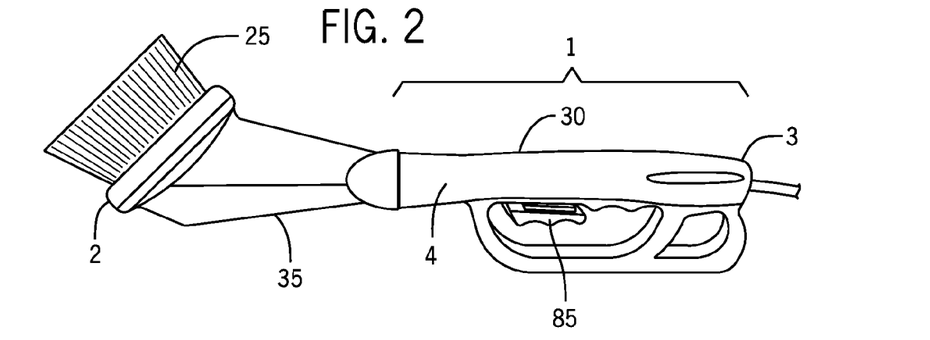
FIG. 2 illustrates a side view of the tire dressing applicator.
Figure 4:
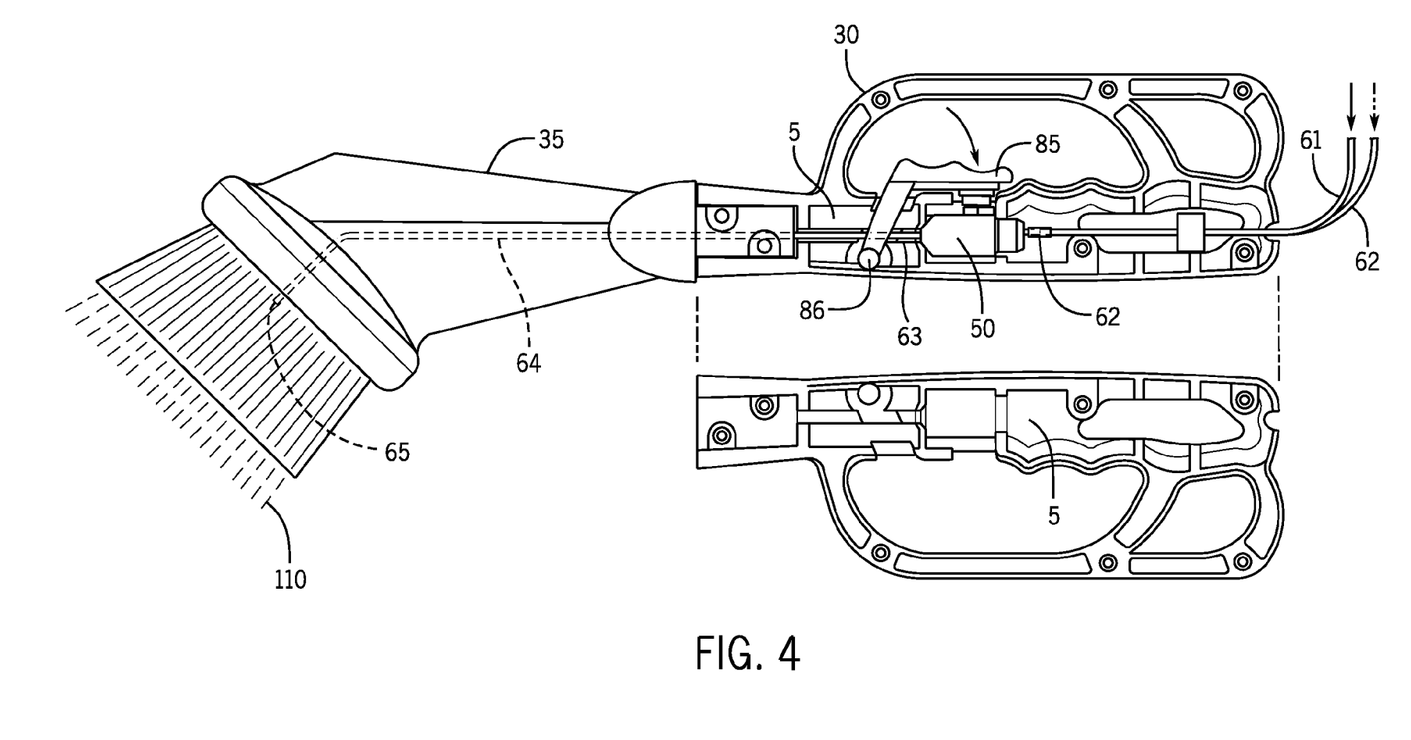
FIG. 4 illustrates an internal cross sectional view of the tire dressing applicator split into two sections.
Figure 6:
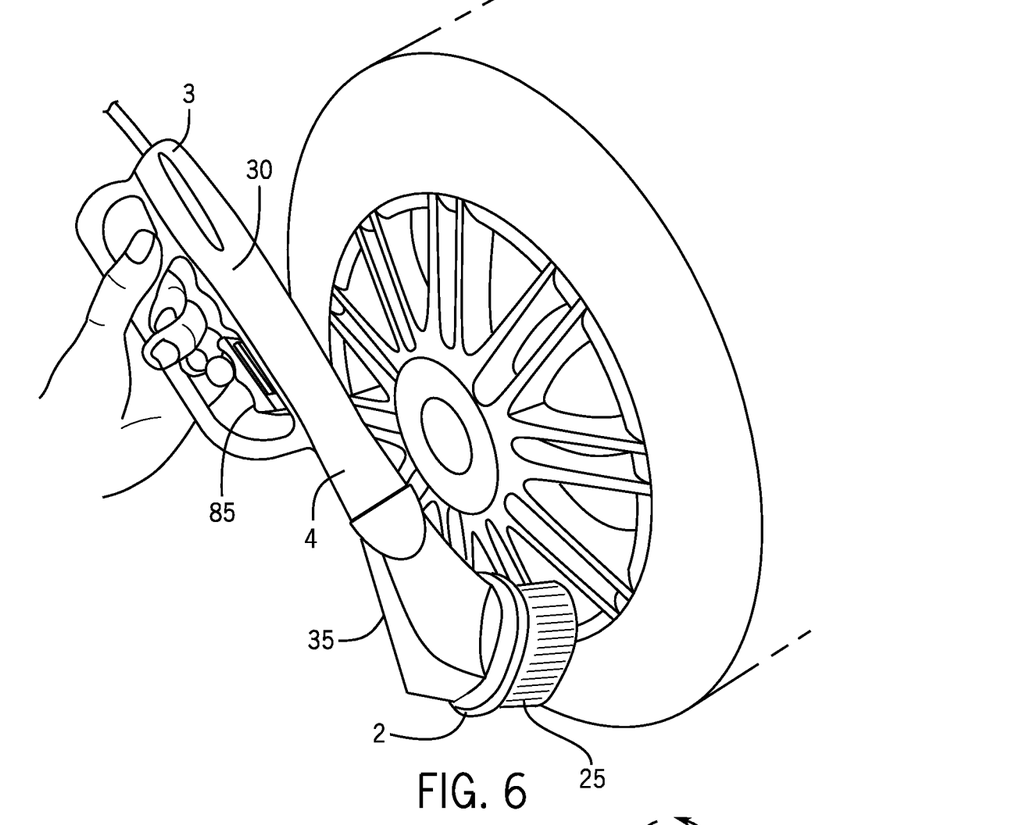
FIG. 6 illustrates the tire shine applicator applying the tire shine fluid to the tire of an automobile.

Referring first to FIG. 2, a tire dressing applicator 1 is provided. In an embodiment, the dressing applicator 1 may resemble a gun assembly. The tire dressing applicator 1 may have a main housing portion 30 and a nozzle portion 35. The tire dressing applicator 1 may further have a first end 2, a second end 3, an exterior side 4 and an interior 5 (FIG. 4). The first end 2 of the tire dressing applicator 1 may be the business end of the device 1 (at the nozzle portion 35) wherein a user applies a tire shine fluid 10 (FIG. 10) to the tire (FIG. 6) of an automobile located, for example, within an in-bay car wash 100 (FIG. 1).

Figure 5:
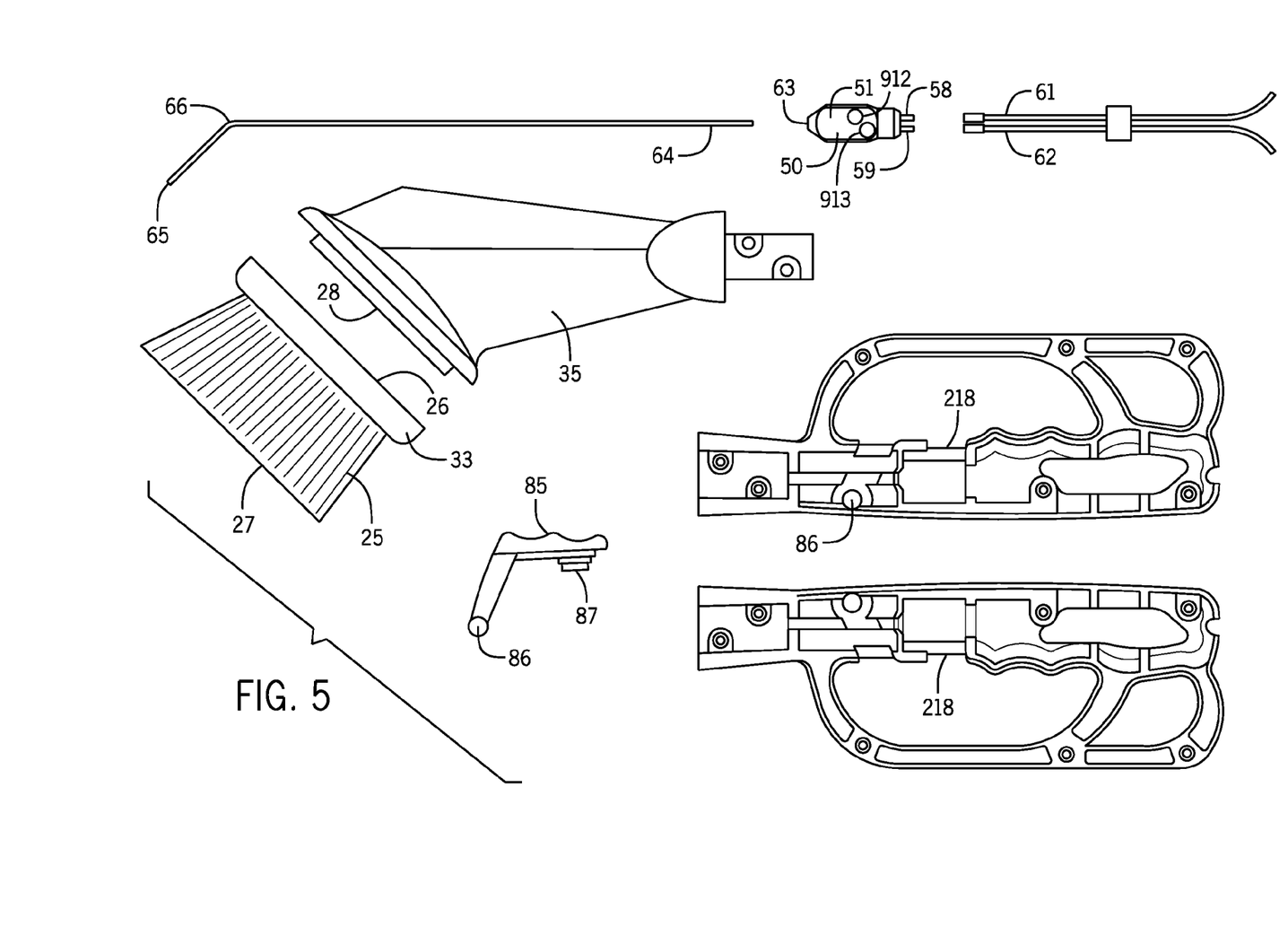
FIG. 5 illustrates an exploded view of the tire dressing applicator.

Located within the interior 5 of the tire dressing applicator 1 may be a two-way valve 50. The two-way valve 50 may have connecting buttons 912, and 913 which control respectively release the air and the tire shine fluid 10. When pressed, the buttons 912 and 913 release the air and tire shine fluid 10 separately into the two-way valve 50 so that they can mix at the opening 65 at the tip of the device 1. The two-way valve 50 may be connected to a first flexible tube 61 and a second flexible tube 62; wherein the first flexible tube 61 and the second flexible tube 62 connect to the two-way valve 50 within the interior 5 of the main housing portion 30 but extend outside the interior 5 of the main housing portion 30. The first flexible tube 61 may contain pressurized air while the second flexible tube 62 may contain a tire shine fluid 10. A first connection port 58 (FIG. 5) on the two-way valve 50 may secure and accept the first flexible tube 61. A second connection port 59 on the two-way valve 50 may secure and accept the second flexible tube 62. A double exterior port 63 may be located on the opposing side of the two-way valve 50 as the first connection port 58 and the second connection port 59.

Figure 10:
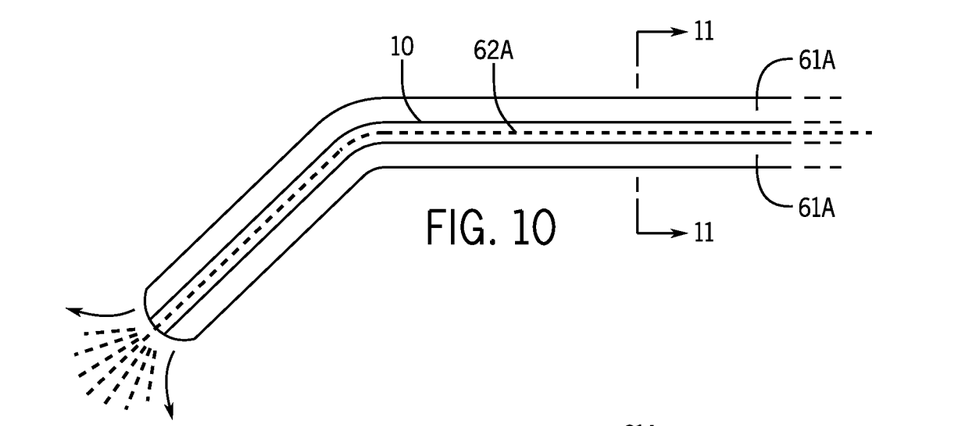
FIG. 10 illustrates a close up view of the tip of the nozzle of the device in an embodiment.
Figure 11:
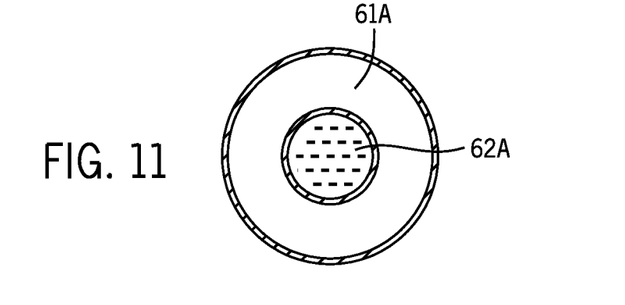
FIG. 11 illustrates a cross section of the tip of the nozzle of FIG. 10.

The double exterior port 63 on the opposing side may connect to a single, generally cylindrical stiff (or non-flexible) delivery tube 64. Referring to FIG. 10, in an embodiment the generally cylindrical stiff delivery tube 64 may have an interior channel 62A located within a larger exterior channel 61A. The interior channel 62A may contain the tire shine fluid 10 while the exterior channel 61A may contain the pressurized air 9. In an embodiment, the first flexible tube 61 and the second flexible tube 62 may be heated. Heating the first flexible tube 61 and the second flexible tube 62 decrease the chances of the tire shine fluid 10 from freezing in the system.

An opening 65 at the distal end of the generally cylindrical delivery tube 64 may expel an atomized mixture 110 made from the pressurized air and the tire shine fluid 10 from the tire dressing applicator 1. The delivery tube 64 may run through the nozzle portion 35 wherein the main nozzle portion 35 is connected to a brush 25 as described below. Allowing the pressurized air and the tire shine fluid 10 to only mix at the very distal end of the generally cylindrical stiff delivery tube 64 (at the opening 65) allows for maximum atomization of the tire shine fluid 10.

In an embodiment, the generally cylindrical delivery tube 64 has a forty-five degree bend 66 located near the opening 65 of the generally cylindrical tube 64. The forty-five degree bend 66 may allow the expelled mixture 110 to be expelled from the applicator 1 at an optimal angle with respect to the tire shine applicator 1. When the pressurized air flows past the tire shine fluid 10 at the opening 65 at the very tip of the generally cylindrical tube 64, the tire shine fluid 10 may be broken up into tiny droplets 110 which may become airborne as they leave the opening 65 of the tire shine applicator 1.

In one embodiment, located at the first end 2 of the tire shine applicator 1, may a removable brush 25. The removable brush 25 may be located at a forty-five degree angle so as to allow a user to grasp the handle portion 35 in a comfortable manner while having the brush 25 smoothly run along the tire. In particular, the removable brush 25 may extend from the nozzle portion 35 at approximately the same angle as the generally cylindrical delivery tube 64.

In an embodiment, the removable brush 25 may have a first end 26 (FIG. 5) and a second end 27. The second end 27 may be the end of the removable brush 25 wherein the bristles come into contact with the tire. The first end 26 of the removable brush 25 may have a support base 33 for the bristles. The support base 33 may temporarily lock into a receiving ridge 28 located on the nozzle portion 35 of the tire shine applicator 1. In an embodiment, the first end 26 of the removable brush 25 may be secured to the receiving ridge 28 by, for example, at least one screw.

Figure 7:
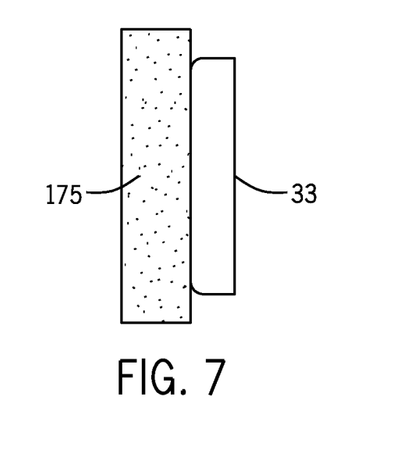
FIG. 7 illustrates a padded applicator which may be applied to the tire shine applicator in an embodiment.
Figure 8:
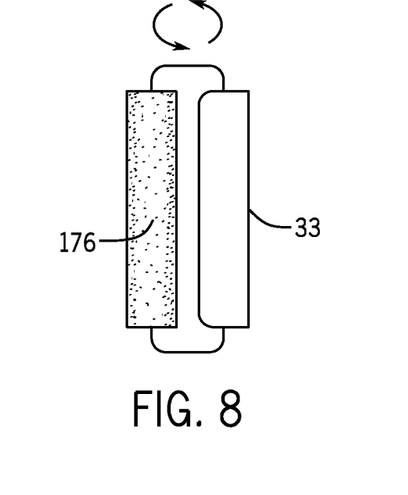
FIG. 8 illustrates a roller applicator which may be applied to the tire shine applicator in an embodiment.

In an embodiment, the removable brush 25 may be removed from the receiving ridge 28 to replace or clean the brush 25. Further, in an embodiment, the removable brush 25 may be removed from the receiving ridge 28 of the tire shine applicator 1 so that a user may substitute the removable brush 25 for other devices such as, for example, a padded applicator 175 (FIG. 7), a roller 176 (FIG. 8) or the like. The padded applicator 175 or roller 176 may be secured to the nozzle portion 35 in a similar fashion as the removable brush 25. In an embodiment, the padded portion 175 may be similar to a dense sponge which may apply the tire shine fluid 10. In the roller 176 embodiment, the padded applicator 175 may resemble a cylindrical sponge surrounding a cylindrical rod of the roller 176.

Referring now to FIG. 4, in an embodiment, a squeeze trigger 85 may be secured to the main body of the handle portion 30. The squeeze trigger 85 may pivot at a pivot point 86 secured within the interior 5 of the tire shine applicator 1. When the squeeze trigger 85 is squeezed, the tire shine fluid 10 may flow through the tire shine applicator 1. An activation button 87 may be located on the squeeze trigger 85. The activation button 87 may extend into the interior 5 of the applicator 1 and may activate the two-way valve 50 located within the interior 5 of the applicator 1. The activation button 87 may pass through an opening 218 (FIG. 5) in the main housing portion 30.

Figure 9:
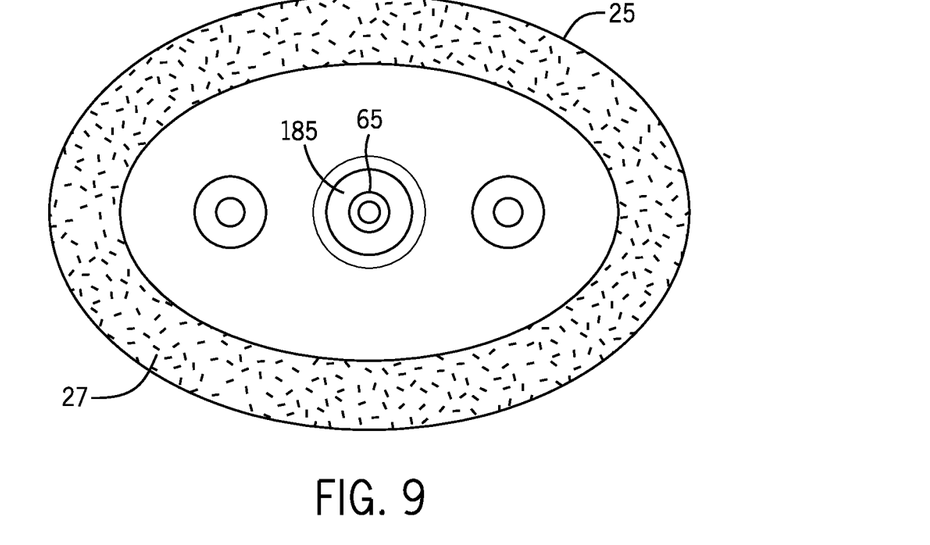
FIG. 9 illustrates a front view of the nozzle of the tire dressing applicator wherein the nozzle guard is visible.

In an embodiment, the device 1 may have a nozzle guard 185 (FIG. 9). The nozzle guard 185 may prevent dirt or debris from gaining access into the opening 65 of the generally cylindrical delivery tube 64 wherein the dirt or debris may cause damage to the device 1. Further, the nozzle guard 185 may prevent the tip of the generally cylindrical delivery tube 64 from freezing. The nozzle guard 185 may be extended more toward the front 2 of the device 1 than the opening 65 which is recessed within the nozzle guard 185. Thus, the opening 65 is protected by the nozzle guard 185 and it is difficult for the tire shine fluid 10 to gain access to the opening 65. In particular, the nozzle guard 185 may provide an extended surface to block debris and dirt wherein the opening 65 is recessed within the nozzle guard 185.

Figure 3:
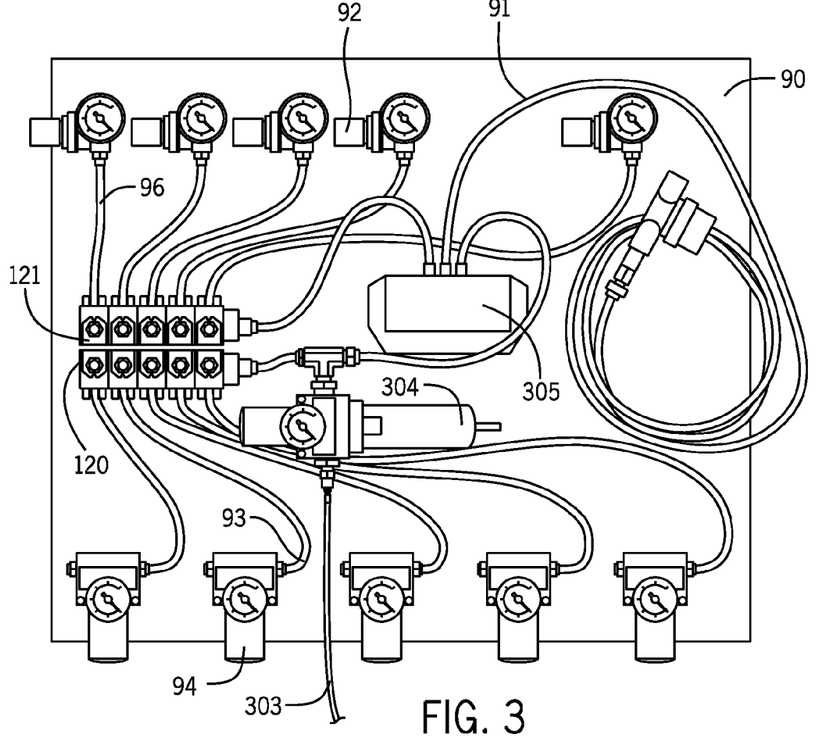
FIG. 3 illustrates an embodiment of the car wash bay fluid line connections for the tire dressing applicator.

Referring now to FIG. 3, in an embodiment, a control valve system 90 may be attached to and may control the tire shine fluid 10 as it runs through the tire shine applicator 1. Although the number of car wash bays 100 a control valve system 90 controls may vary, FIG. 3 illustrates a main control valve system 90 which controls five car wash bays 100. In use, each car wash bay 100 requires a fluid solenoid 121, an air solenoid 120, a fluid regulator 92 and an air regulator 94.

In an embodiment, the fluid solenoid 121 may allow the tire shine fluid 10 to flow when quarters are deposited in a car wash bay coin receiver (not shown). The air solenoid 120 may allow the pressurized air to flow when a selector switch (not shown) is turned to "tire shine" in the car wash bay 100. Further, the fluid regulator 92 may allow a person to select a precise amount of tire shine fluid 10 to effectively spray from the nozzle 35. The fluid regulator 92 is connected to the fluid solenoid 121 by a connecting tube 96. In an embodiment, the air regulator 94 may allow a precise amount of pressurized air to flow to the device 1 to properly apply the tire shine fluid 10. The air regulator 94 is connected to the air solenoid 120 by a tube 93

In an embodiment, an air filter/water regulator separator 304 may be attached to a pressurized air intake 303. The air filter/water regulator separator 304 may plug into any available air compressor which therein powers the pump (305) and sends compressed air to be mixed at the tip of the nozzle with tire shine fluid 10 to create an atomized spray. A fluid pick up line and strainer 91 may be secured to a fluid reservoir (not shown). The fluid reservoir may be inserted into a fluid reservoir so that fluid can be sucked up and sprayed on the tire.

As stated above, the tire shine applicator 1 may be secured within, for example, an in-bay car wash 100. The tire shine applicator 1 may be connected to a fluid deliver tube 147 (FIG. 1) which is secured on a swivel 140. The swivel 140 may allow a user to effectively maneuver the tire shine applicator 1 within the car wash so as to reach all the tires of the car without the need to move the car. Finally, in an embodiment, the tire shine fluid 10 is has a vacuum system (not shown) wherein the tire shine fluid 10 is vacuumed back into the reservoir to prevent the tire shine fluid 10 from freezing within the system.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. An in-bay car wash tire dressing applicator comprising:
    a gun assembly housing having a front, a back, a first side, a second side, a top, a bottom and an interior;
    a two-way valve located within the interior of the gun assembly housing wherein the two-way valve receives a first flexible tube and a second flexible tube and wherein the first flexible tube and the second flexible tube extend from within the interior of the gun assembly housing to outside of the gun assembly housing;
    wherein the first flexible tube contains pressurized air and wherein the second flexible tube contains a tire shine fluid;
    a single non-flexible tube exiting the two-way valve wherein the single non-flexible tube has an interior having an interior tube of substantially the same length and wherein an opening is present at both an end of the single non-flexible tube and an end of the interior tube of the single non-flexible tube;
    wherein the pressurized air flows through the outer portion of the single non-flexible tube and wherein the tire shine fluid flows through the interior tube of the single non-flexible tube; and
    and wherein the tire shine fluid and the pressurized first air mix at the opening of the single non-flexible tube.

2. The in-bay car wash tire dressing applicator of claim 1 further comprising:
    a removable brush at the first end of the gun assembly housing wherein the opening of the single non-flexible tube is located within a middle of the removable brush.

3. The in-bay car wash tire dressing applicator of claim 2 further comprising:
    a nozzle guard surrounding the opening of the single non-flexible tube wherein the nozzle guard surrounds the opening of the single non-flexible tube and extends farther away from the two-way valve than the opening of the single non-flexible tube therein creating a recessed surface to surround the opening of the single non-flexible tube.

4. The in-bay car wash tire dressing applicator of claim 1 wherein the single non-flexible tube has a forty-five degree bend located near the opening of the single non-flexible tube.

5. The in-bay car wash tire dressing applicator of claim 1 further comprising:
    a padded sponge located at the first end of the gun assembly housing wherein the opening of the single non-flexible tube is located within a middle of the padded sponge.

6. The in-bay car wash tire dressing applicator of claim 1 wherein the first flexible tube is heated.

7. The in-bay car wash tire dressing applicator of claim 1 wherein the second flexible tube is heated.

* * * * *